United States Defensive Publication [19] (H) [11] T103,401

Majewicz [43] Sep. 6, 1983

[54] USE OF CARBOXYMETHYL HYDROXYETHYL CELLULOSE IN FRACTURING FLUIDS

[76] Inventor: Thomas G. Majewicz, R.D. 1, Box 285, Chadds Ford, Pa. 19317

[21] Appl. No.: 449,096

[22] Filed: Dec. 13, 1982

[51] Int. Cl.[3] ..... E21B 43/26

[52] U.S. Cl. ..... 252/8.55 R; 166/308

[57] ABSTRACT

Carboxymethyl cellulose is not normally considered a good candidate as a thickener for fracturing fluids for subterranean formations due to the poor salt sensitivity of its solutions. It has been found that if carboxymethyl cellulose is modified with hydroxyethyl functionality, the salt sensitivity of its aqueous solutions is improved to a point where it can be used in this application. Specifically, carboxymethyl hydroxyethyl cellulose having carboxymethyl D.S. of 0.7 to 1 and hydroxyethyl M.S. of 0.3 to 2 can be so employed.

1 Claim, No Sheets Drawing,

5 Pages Specification

The file of this unexamined application may be inspected and copies thereof may be purchased (849 O.G. 1221, Apr. 9, 1968).